Jan. 22, 1935.   B. H. CALDWELL   1,988,717

SHIELD

Original Filed Sept. 23, 1931   2 Sheets-Sheet 1

INVENTOR
Burr H Caldwell
BY

ATTORNEY

Jan. 22, 1935.  B. H. CALDWELL  1,988,717
SHIELD
Original Filed Sept. 23, 1931   2 Sheets-Sheet 2
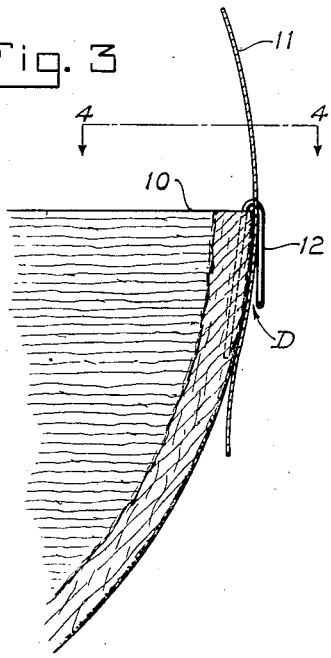
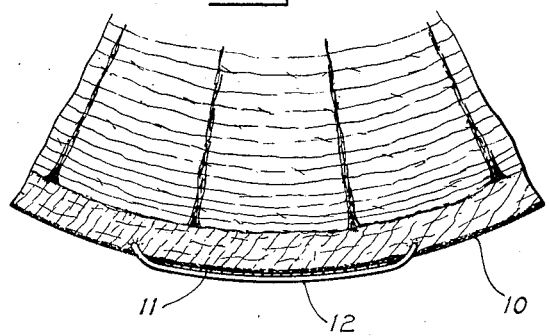
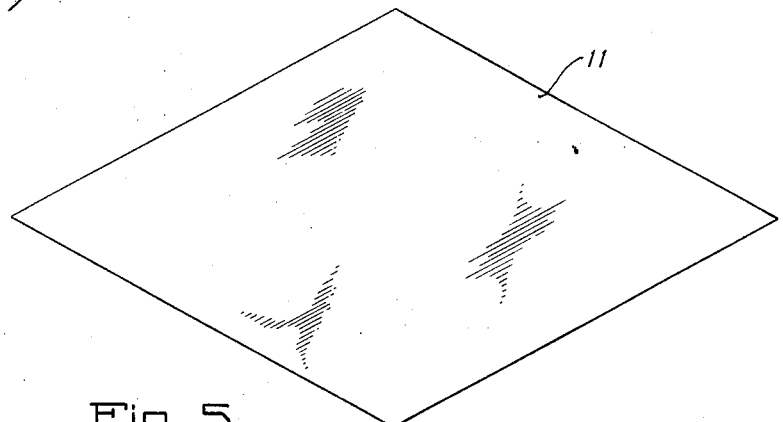
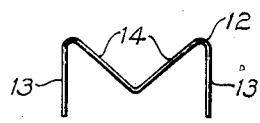
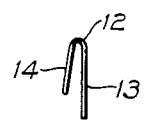
INVENTOR
Burr H. Caldwell
BY
ATTORNEY Patented Jan. 22, 1935

1,988,717

UNITED STATES PATENT OFFICE 1,988,717

SHIELD

Burr H. Caldwell, Niagara Falls, N. Y.

Application September 23, 1931, Serial No. 564,489
Renewed June 21, 1934

8 Claims. (Cl. 65—25)

The present invention relates to shields.

More particularly the present invention relates to shields or the like to be used with fruit, such as grapefruit or oranges, when said fruit is eaten from the skin or rind thereof. The present invention contemplates a shield which may be used with half of the fruit in the form in which grapefruit and oranges are commonly served. For purposes of conciseness particular reference will be made to grapefruit. It will be understood, however, that the invention is applicable to all forms of citrus fruits, cantaloupe, melons, and other food which is served in cup-shaped form.

An object of the present invention is to provide a shield which in its preferred embodiment is transparent, which will be cheap, which may be readily applied to fruit, and which will be efficient in guarding against the accidental splashing of the juices of the fruit.

A further object is to provide a transparent shield for fruit, which shield, together with the fruit, will present a symmetrical and pleasing appearance.

A further object is to provide a transparent shield which is so cheap that it may with economy be used only once, if preferred, and then discarded.

A further object is to provide a shield for fruit which presents efficient surfaces for advertising matter without interfering with the efficiency or appearance of the shield.

A further object is to provide a shield which may be cut from material as commercially provided with a minimum of waste of material.

A further object is to provide a shield which will give a maximum of protection against splashing with a maximum of clearance for the spoon with which the fruit is eaten.

A further object is to provide a shield involving only simple parts, which may be shipped with a minimum of bulk.

Further objects will appear as the description proceeds.

Referring to the drawings—

Figure 1 illustrates one embodiment of the present invention applied to a piece of fruit, which fruit may be a grapefruit or the like;

Figure 3 is an enlarged fragmentary sectional view taken along the plane indicated by the arrows 3—3 of Figure 1;

Figure 4 is an enlarged sectional view taken along the plane indicated by the arrows 4—4 of Figure 3;

Figure 5 is a view, on a reduced scale, of a transparent member which may be used in the practice of the present invention; and Figures 6 and 7 are side and end views, respectively, of a wire clip which may be used in holding in place the transparent member illustrated in Figure 5.

Figure 1:
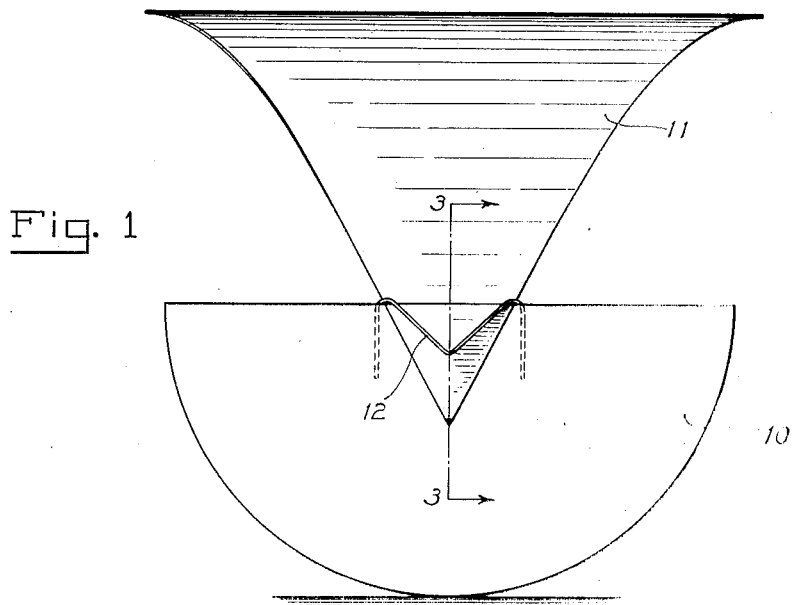

The numeral 10 indicates half of a citrus fruit or the like, and the numeral 11 indicates a shield, which according to the preferred embodiment of the present invention should be transparent. The shield 11, for economy of cutting from the sheets of material as commonly provided commercially, preferably should be diamond-shaped when in flat condition, as illustrated in Figure 5.

It is at present preferred to use for the member 11 the material which is commonly known in the art as cellophane, this being a cellulose sheet which is flexible but which has sufficient stiffness to hold a bowed or arcuate form when the ends thereof are secured. The material referred to may be had commercially in a wide variety of thicknesses. At present it is preferred to use material ranging between .003 inches and .005 inches in thickness, to promote ease in handling and to provide the necessary maintenance of its shape when in bowed condition.

The flexible member 11 is held in position on the fruit 10 by means of a pair of clips 12—12 located adjacent to opposite ends of a diameter of the fruit. The illustrated embodiment of the clip 12 comprises a piece of wire bent into a shape resembling the letter M in front view, said clip comprising the pair of substantially parallel legs 13—13 and the intermediate portions 14—14 disposed in V-shaped relationship to one another. As will be noted from an inspection of Figure 7, the portions 14 are set into angular relationship with the plane of the legs 13—13 before being applied to the fruit. The portions 14—14 of the clip 12 may be bowed throughout their length, as shown in Figure 4, to conform to the rounded contour of the fruit. The material of the clip 12 may be approximately #22 round wire, though it will be clear that other forms of clip fall within the scope of the invention.

Figure 2:
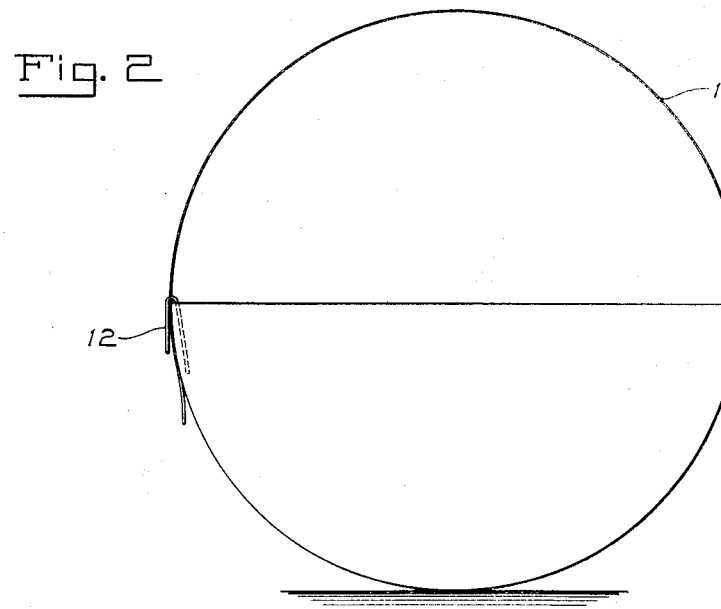
Figure 2 is a view of the structure shown in Figure 1, Figure 2 being a view of a region spaced 90 degrees from the region illustrated in Figure 1.

The method of applying the shield 11 to the fruit may be substantially as follows: One of the clips 12 is mounted on the fruit 10 by pushing the two legs 13—13 into the upper cut surface of the rind of the fruit just inside of the tough outer skin. The portions 14—14 of the clip hang over the outside of the fruit, as clearly shown in Figures 1, 2, 3 and 4. To facilitate the entry of the legs 13—13 into the edge of the fruit, said legs should extend to a region below the meeting point of the portions 14—14 of the clip. In inserting the legs 13—13, they will be pushed at a slight angle toward the axis of the fruit, following the downward contour of the rind, thereby avoiding the danger that the extremities of said legs 13 will break through the skin and present an unsightly appearance. After the first clip is in place another clip will be inserted in like manner at the other side of the fruit. The only portions of the clip now visible will be the center portions 14—14, which tend to follow the curvature of the fruit and hug the skin thereof tightly, except for the region adjacent to the juncture of the portions 14—14. A slight clearance, indicated by the letter D in Figure 3, will occur between the rind of the fruit and the juncture of the portions 14—14. This slight clearance D results from the downward curvature of the fruit and the flatness of the clip.

With the clips 12—12 in place, the shield 11 is inserted according to the following steps. One of the acute angular ends of the shield 11 is inserted beneath the portions 14—14 of the clip. After said acute angle of the shield 11 has been inserted into the clip 12, said end should be grasped with the fingers and pulled through the clip as far as it will go. During this procedure the shield itself, which is flexible, should be kept away from the juices of the fruit so as not to become soiled. After one extremity of the shield has been secured in place, the other extremity is inserted into the opposite clip and pulled down as far as it will go. The shield will now be arched over the piece of fruit 10, as clearly indicated in Figures 1 and 2.

After the above steps have been carried out, a curved hood of pleasing shape is provided, which is wide at the top and which presents a pleasing and symmetrical appearance.

The shield does not interfere to any material extent with eating the fruit, inasmuch as working clearance for a spoon is provided throughout almost the entire periphery of the piece of fruit into the center thereof.

The shield 11 will adapt itself to varying sizes of fruit within limits. Inasmuch as hotels and restaurants order predetermined sizes of fruit for their dining rooms, it will not be necessary for such places of business under ordinary conditions to stock more than one or two sizes of the shield 11.

Advertising matter may be printed in attractive ink adjacent to the two acute extremities of the diamond-shaped shield 11, which advertising matter will not interfere with visibility through the shield 11 and which may be designed to enhance the appearance of the shield.

Though a preferred embodiment of the present invention has been described in detail, many modifications will occur to those skilled in the art. It is intended to cover all such modifications that fall within the scope of the appended claims.

What is claimed is—

1. In combination, a cup-shaped piece of fruit, a semi-stiff piece of transparent material bowed across the upper side of said piece of fruit symmetrical with respect to a diameter of the top of said piece of fruit, and a pair of clips disposed at the ends of said diameter for holding said shield in place upon said piece of fruit.

2. In combination, a cup-shaped piece of fruit, a shield bowed across the top of said piece of fruit, said shield having wedge-shaped extremities, the bowed portion of said shield being substantially symmetrically disposed with respect to a straight line extending through said wedge-shaped extremities, and a pair of diametrically opposed clips secured to said fruit for receiving and holding said extremities.

3. In combination, a cup-shaped piece of fruit, a shield bowed across the top of said piece of fruit, and a pair of diametrically opposed clips for receiving and holding the extremities of said shield, said clips comprising pieces of wire each bent into M-shape and having their legs inserted into said fruit, the intermediate portions of said clips being in overlying relationship with said extremities, said clips having the intermediate portions thereof initially set into angular relationship with the outer legs thereof, said outer legs being inserted into the periphery of said fruit, said intermediate portions lying outwardly of said fruit.

4. A shield adapted to be bowed over a cup-shaped portion of a citrus fruit, and means for fastening said shield to said fruit at the ends of a diameter of said fruit, said shield comprising a diamond-shaped semi-stiff piece of transparent material.

5. A shield adapted to be bowed over a cup-shaped portion of a citrus fruit, and means for fastening said shield to said fruit at the ends of a diameter of said fruit, said shield comprising a semi-stiff piece of transparent material, said piece of material having wedge-shaped extremities for cooperation with said fastening means.

6. A shield adapted to be bowed over a cup-shaped portion of a citrus fruit, and clips for fastening said shield to said fruit at the extremities of a diameter thereof, said clips comprising pieces of wire each bent into M-shape and adapted to have their legs inserted into said fruit, the intermediate portions of said clips being in overlying relationship with the extremities of said shield.

7. A shield adapted to be bowed over a cup-shaped portion of a citrus fruit, said shield having wedge-shaped extremities, means for fastening said extremities to said fruit at the ends of a diameter of said fruit, a pair of clips for receiving and holding said extremities, said clips comprising pieces of wire each bent into M-shape and adapted to have their legs inserted into said fruit, intermediate portions of said clips being in overlying relationship with said extremities.

8. In combination, a cup-shaped piece of fruit, a semi-stiff piece of material bowed across the upper side of said piece of fruit symmetrical with respect to a diameter of the top of said piece of fruit, and a pair of clips disposed at the ends of said diameter for holding said shield in place upon said piece of fruit.

BURR H. CALDWELL.